UNITED STATES PATENT OFFICE.

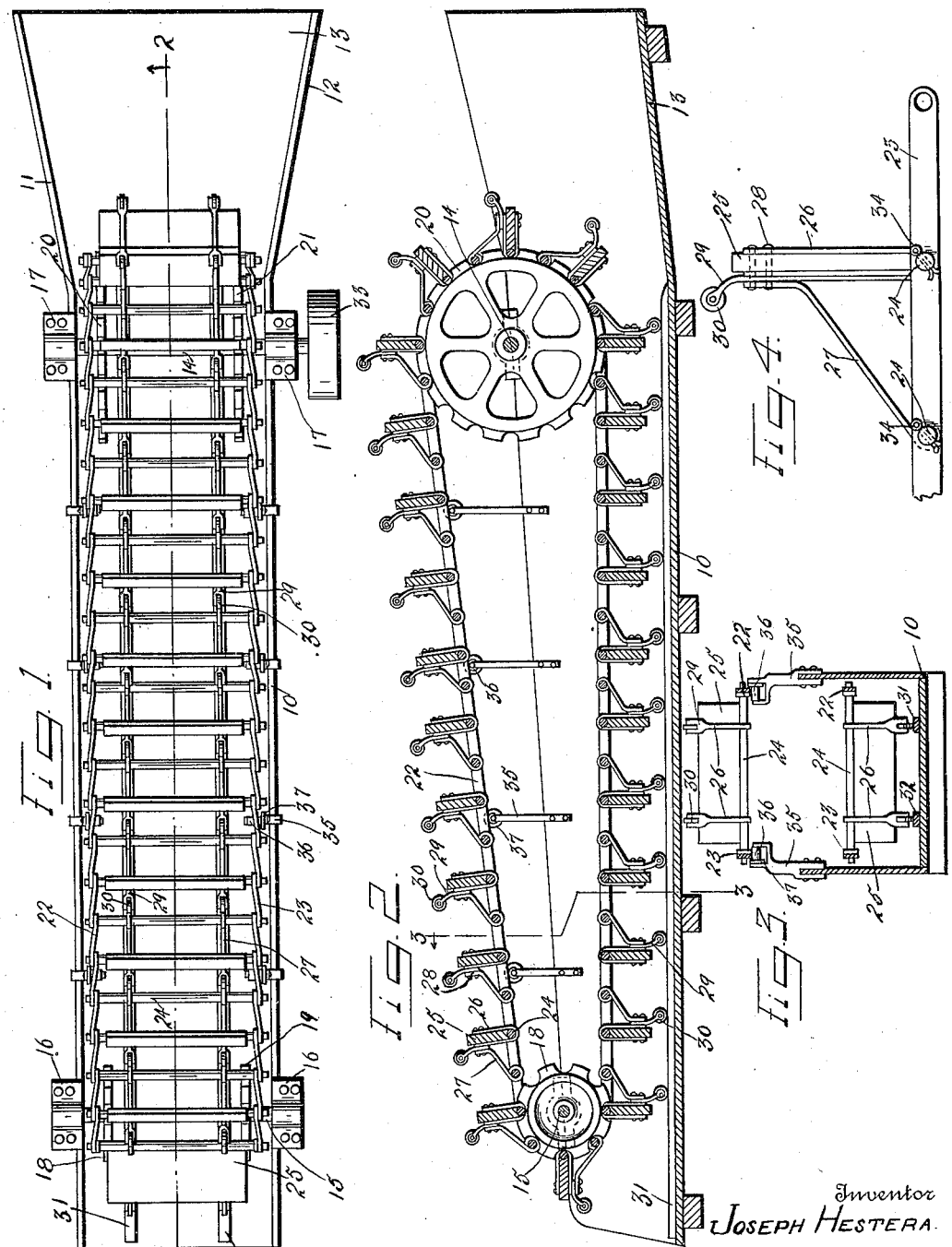

JOSEPH HESTERA, OF HANKINSON, NORTH DAKOTA.

CURRENT-MOTOR.

1,004,787. Specification of Letters Patent. Patented Oct. 3, 1911.

Application filed April 28, 1910. Serial No. 558,304.

*To all whom it may concern:*

Be it known that I, JOSEPH HESTERA, a citizen of the United States, residing at Hankinson, in the county of Richland, State of North Dakota, have invented certain new and useful Improvements in Current-Motors; and I do hereby declare the following to be a full, clear, and exact description of the invention, such as will enable others skilled in the art to which it appertains to make and use the same.

This invention relates to improvements in motors, more particularly to the class operative by flowing water and generally known as "current" motors, and has for one of its objects to improve the construction and increase the efficiency and utility of devices of this character.

With this and other objects in view, the invention consists in certain novel features of construction as hereinafter shown and described and then specifically pointed out in the claim; and, in the drawings illustrative of the preferred embodiment of the invention, Figure 1 is a plan view of the improved device, Fig. 2 is a section on the line 2—2 of Fig. 1, Fig. 3 is a transverse section on the line 3—3 of Fig. 1, Fig. 4 is a sectional detail of one of the improved buckets together with a portion of the chain whereby the buckets are united and operated.

The improved device consists generally in two endless chains operating over suitable chain wheels and provided with a plurality of buckets or blades spaced apart and extending between the chains, and may be of any required size and of any required length, and so located that the buckets will be acted upon by flowing water. The improved device will preferably be located in a flume or chute whereby the flowing water is confined and utilized with greater economy, and for the purpose of illustration the improved device is thus shown, but it will be understood that it is not desired to limit the invention to use in any specific locality. In the drawings a conventional chute or flume is shown at 10 and is provided with an intake having converging side walls 11—12 and a level bottom 13. The flume or chute is formed with vertical sides, and mounted for rotation upon the chute near its ends are shafts 14—15, the shafts being supported by boxes 16—17, of the usual construction. The shaft 14 is provided with spaced chain wheels 18—19, while the shaft 15 is provided with chain wheels 20—21, the wheels 20—21 being considerably larger than the wheels 18—19. Endless chains are arranged to operate over the chain wheels and represented respectively at 22—23. The chains are formed respectively of a plurality of links coupled by transverse rods 24, the rods being spaced apart by the links and operating in the usual recesses in the chain wheels. By this arrangement the chains are operated simultaneously over the chain wheels and impart motion to the shafts 14—15.

Bearing upon each of the alternate rods 24 is a blade or bucket 25, each bucket being coupled to one of the rods by U-shaped straps 26 spaced apart, two straps being employed for each of the buckets. Coupled to the remaining alternate rods 24 are braces 27, one brace being employed for each of the straps 26 and riveted or otherwise secured thereto at 28 near the outer edge of the bucket. Located between each of the braces 27 and its corresponding strap 26 is an arm 29 having its outer end forked to support a bearing roller 30. The brackets are secured in place by the same rivets 28 which secure the braces as represented more clearly in Fig. 4. The brackets 29 are bent away from the buckets 25 and toward the braces 27, as shown.

Located upon the bottom of the chute 10 are bearing tracks 31—32, the tracks designed to receive the bearing rollers 30 which for the time being are located at the bottom of the traveling belt of buckets, as shown in Fig. 2. By this simple arrangement it will be obvious that as the water is permitted to flow into the intake 13 and through the chute 10 it will engage the lower series of buckets and thus rotate the chains and thus impart motion to the shafts 14—15, and thus transmit the power of the flowing water to the shafts and thence to suitable mechanism, as for instance to a belt pulley 33 connected to the shaft 15. The series of buckets are supported from sagging by the bearing rollers 30, while the buckets are firmly supported and prevented from deflection by the braces 27. The various rods 24 are maintained in position in any suitable manner, but preferably by cotter-pins 34, as shown in Fig. 4, so that any link or series of links may be detached without interfering with the other parts of the device. By this means any impaired or broken link may be removed without discarding the remainder of the chain. Connected to the vertical sides of the chute at suitable points are standards 35 carrying bearing rollers 36 over which the upper lengths of the chains operate and by which they are supported, the rollers being provided with flanges 37 at their outer ends to limit the outer movement of the chains and prevent them from displacement. The shafts 14—15 may be of any required length so that the buckets 25 may be of corresponding length, to adapt the improved device to any machinery which it may be desired to drive.

What is claimed is:—

In a current motor, two shafts spaced apart and provided with sprocket wheels, endless chains operating over said sprocket wheels, said chains comprising links and cross rods connecting said links and spacing said chains apart, a blade bearing upon each alternate rod, a plurality of straps bearing around each rod upon which the blade bears and extending upon opposite sides of the blade and secured thereto, a brace pivoted at one end to each other alternate rod, the free end of said brace being secured to the outer ends of each strap and an outwardly extending arm secured between said brace and strap, said arm being bifurcated at its free end and provided with a roller.

In testimony whereof, I affix my signature, in presence of two witnesses.

JOSEPH HESTERA.

Witnesses:
W. A. HELEY,
C. S. PHELPS.

Copies of this patent may be obtained for five cents each, by addressing the "Commissioner of Patents. Washington, D. C."